Patented June 8, 1948

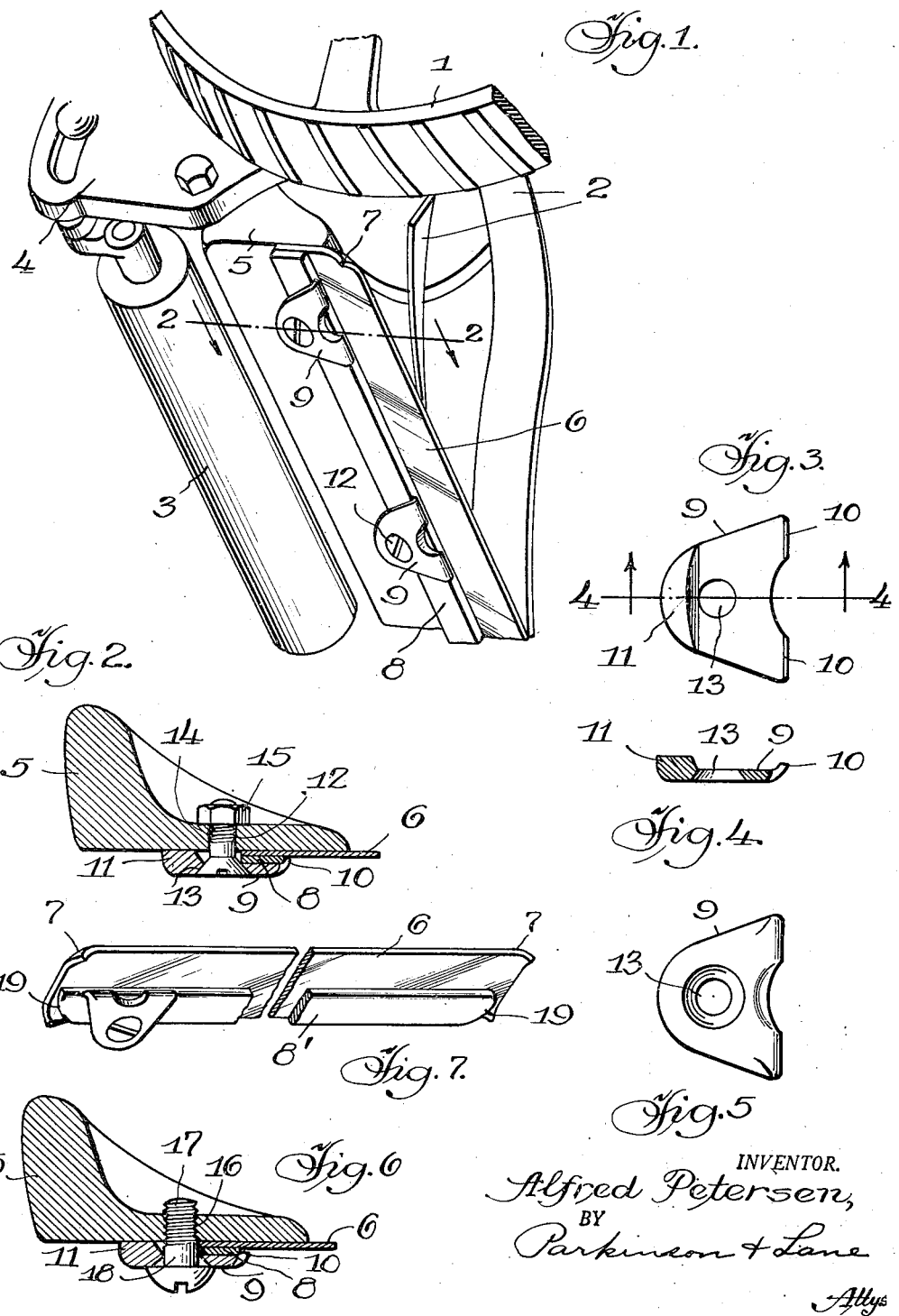

2,443,080

UNITED STATES PATENT OFFICE 2,443,080

LAWN MOWER ATTACHMENT

Alfred Petersen, Chicago, Ill.

Application July 14, 1944, Serial No. 544,878

3 Claims. (Cl. 56—294)

This invention relates to an attachment for lawn mowers, especially adapted for effectively holding a thin, flexible, steel blade securely in place on the stationary cutter-bar, and of such nature that the old rigid and unflexible stationary blade of the lawn mowers now on the market, and those already in use, can be removed and have substituted therefor my flexible blade, with a minimum of effort, maximum sturdiness of support, and effectiveness and ease of operation of the cutting parts of the lawn mower.

In the present type of lawn mowers now in general use the stationary blade is of rather heavy construction and is rigid and unflexible in operation. This means that when such lawn mower has been in use for a greater or less time, either or both the stationary and revolving blades become worn and fail to do a perfect job of severing the grass. If an attempt is made to reset the stationary blade by turning the usual adjusting screws, the usual result is that the lawn mower is hard to push and also does not satisfactorily and cleanly sever the grass. It is expensive to have the cutting blades reground, and even then the improvement is only temporary.

With my improved thin, flexible blade and novel mounting of the same on the stationary cutter-bar, I have produced a lawn mower that is easy to push, does not require regrinding, and will continuously do a satisfactory job of cleanly severing the grass, by reason of the edge of the flexible blade always closely following the edges of the revolving blades.

Among the objects of my invention is to overcome the objections and accomplish the advantages set forth above.

A further object is to provide a reversible blade so that either of its side edges may be presented for use as desired.

Another object is to provide a down-curled corner on each of the four corners of the flexible blade so that no matter which side edge is presented to the revolving blades the latter will be smoothly guided onto the edge of the flexible blade, as well as to give a better support from the clamping bar.

A still further object is to provide a novel clamping means for clamping the thin flexible blade to the stationary cutter-bar to properly position and effectively hold these parts together.

A further object is to enable the quick and easy application of my thin flexible blade to a stationary cutter-bar regardless of whether the removed rigid blade was bolted or riveted thereto.

Other objects, advantages and capabilities inherently possessed by my invention will later be more fully appear.

My invention further resides in the combination, construction and arrangement of parts illustrated in the accompanying drawing, and while I have shown therein a preferred embodiment, I wish it understood that the same is susceptible of modification and change without departing from the spirit of my invention.

In the drawing:

Fig. 1 is a fragmentary perspective view of a portion of one corner of a lawn mower showing my attachment in place thereon.

Fig. 2 is a vertical transverse section on the line 2—2 of Fig. 1.

Fig. 3 is a top plan view of one of the clamping lugs for securing the flexible blade to the stationary cutter-bar.

Fig. 4 is a section on the line 4—4 of Fig. 3.

Fig. 5 is a bottom plan view of the clamping lug shown in Fig. 3.

Fig. 6 is a transverse section similar to that shown in Fig. 2 but showing a screw used in cases where the original rigid stationary blade was fastened to the stationary cutter-bar by rivets instead of bolts.

Fig. 7 is a perspective view, partly broken away, of a modified form of my flexible blade showing a clamping lug and clamping bar applied thereto.

Referring more in detail to the drawing my invention is applied to the usual type of lawn mower now in use which comprises a pair of ground engaging drive wheels 1, helically arranged revolving cutter blades 2, a roller 3, frame 4 and stationary cutter-bar 5 provided with the usual adjusting screws (not shown) for adjusting the stationary blade with relation to the revolving blades.

In my improved machine the heavy, rigid and unflexible stationary blade, which in the old machines now in use is secured to the cutter-bar 5 with a number of screws, bolts or rivets, passing through registering holes in the blade and bar, has been removed, and in its place I have substituted my improved thin steel, flexible blade 6, which is of such thinness and flexibility, that its forward cutting edge will closely follow the contour of the cutting edge of each of the revolving cutter blades as they respectively pass thereover, so as to at all times be closely in contact therewith to constantly effect efficient severing of the grass. A slight pressure will continually be exerted by the cutting edge of the flexible stationary blade against the cutting edges of the revolving blades such that a slight wave will pass from one end of the stationary blade to the other as the point of contact of the revolving blade passes thereover.

As will be understood my flexible blade will have at one end of its cutting edge a down-curled corner 7 to cause the approaching end of the revolving blade to tangentially meet the same and pass smoothly thereover. This movement will also flex the flexible blade a slight amount to insure positive cutting of the grass at all times. Such flexing was impossible with the old rigid, unflexible, stationary blade.

With my present type of thin, flexible stationary blade, it is of utmost importance that this blade be properly and effectively secured to the stationary cutter-bar. The structure and mounting to accomplish this result will now be described.

The old type of stiff, unflexible, stationary blade, is secured to the cutter-bar by bolts, rivets or the like passing through the blade and the cutter-bar, and held in place by a nut, riveted head or other appropriate means. In carrying out my present invention my novel attachment may be either applied to a new lawn mower at the factory, or applied to a lawn mower of the old type already in use by removing the stiff, unflexible stationary blade by removing the bolts, cutting off the rivet heads and removing the rivets, removing securing screws, or in any suitable manner, and then applying my attachment thereto, which change from the old to the new may be easily made within a few minutes. I am thus able to convert a hard-to-push, inefficiently operating, old lawn mower into an easily pushed and efficiently operating lawn mower.

In Fig. 2 I have shown how my attachment, unless originally built into place at the factory, may be applied to a lawn mower already in use (when the mower is turned upside down) by removing the bolts holding the rigid, unflexible, stationary blade to the cutter-bar 5, removing said old blade, placing my improved flexible blade 6 flat against the under face of the cutter-bar to project a suitable distance in front of the front edge thereof, then placing the elongated, narrow clamping bar 8 against the rear portion of the face of blade 6, then applying the clamping lug 9 over the clamping bar with its front flanges 10 (which as seen in Fig. 6 are of slightly less height than the thickness of the clamping bar) engaged over the forward edge of the clamping bar and its rear flange 11 (which is of greater height than the height of the front flanges) bearing against the cutter-bar to place the clamping lug in proper position to most effectively and securely hold the parts together when the screw bolt 12 is passed through the countersunk hole 13 in the clamping lug 9 and hole 14 in the cutter-bar, and the nut 15 tightened. The clamping bar at its front edge contacts the front flanges of the clamping lugs, and at its rear edge contacts the screws securing the clamping lugs to the cutter-bar. This arrangement of parts gives the best results as to clamping the flexible blade against the cutter-bar and at the same time places the cutting edge of the stationary flexible blade in the most effective position forwardly of the front edge of the cutter-bar to enable it to be flexed downwardly a slight amount due to any irregularities in the cutting edges of the revolving blades. From this it is apparent that grinding of the lawn mower blades is not necessary as the flexible cutting edge of the stationary blade will automatically adjust itself to a wide range of irregularities in the cutting edges of the revolving blades. When the flexible blade is properly initially positioned, as described above, the lawn mower will push easily in operation and do a nice clean job of severing the grass.

In Fig. 6 I have shown how the flexible blade is attached to the cutter-bar in cases where it was necessary in removing the old rigid unflexible blade to remove rivets by drilling and then tapping threads in the cutter bar, or drill new holes at other points and tap threads in such holes, and screwing the threaded end of a screw bolt therein. Regardless of how or why such holes are drilled in the cutter-bar, Fig. 6 shows such holes formed with threads 16 and receiving the threads 17 of the screw 18 tightened therein. The construction and arrangement of the flexible blade, clamping bar and clamping lug, and the action of the flexible blade with relation to the cutter-bar are the same in Fig. 6 as in Fig. 2.

In Fig. 7 I have illustrated how the flexible blade may have each of its four corners curled similarly to curled corner 7, and the rear end corners of the clamping bar 8' be correspondingly curved as at 19 to be snugly seated in the adjacent curled corners of the flexible blade to provide a more positive and effective clamping of this blade to the cutter-bar. This arrangement also makes possible the use of either of the side edges of the flexible blade as a cutting edge by simply loosening the tightening screws, bolts or the like, removing the blade, reversing it to present the other edge for cutting (with the curled corners still directed away from the revolving blades), properly arranging the parts, and again tightening the screws, bolts or the like. Any appropriate number of clamping lugs may be used as desired.

From the above it is seen that I have provided a lawn mower attachment that may either be built in place at the factory when the lawn mower is originally manufactured, or may be easily and quickly substituted for the old rigid, unflexible stationary blade of lawn mowers already in use. Also I have provided an attachment having a thin, flexible stationary blade in which the cutting edge may bear against the cutting edges of the revolving blades with a slight pressure, and at all times due to its flexibility will closely follow any irregularities that might exist, due to wear or otherwise, in the revolving blades' cutting edges. I have also provided such attachment with novel and quickly applied securing means, and have made it unnecessary to grind lawn mower blades, and yet have a machine that is easy to push and will at all times cut the grass cleanly and uniformly.

Having thus described my invention, I claim:

1. A lawn mower attachment adapted to be secured to the stationary cutter-bar of a lawn mower, comprising a thin, flexible blade having a curled portion on each of its four corners, a clamping bar having its two rear corners curved to fit into the curled portions of the rear corners of the blade when the clamping bar is applied to the rear face portion of the blade, a plurality of clamping lugs bearing against the clamping bar, each of said lugs having a shoulder bearing against the front edge of said bar, and means for tightly securing the lugs, clamping bar, blade and cutter-bar together, said lug shoulders and said rear curved corners cooperating to firmly hold the blade and bar against edgewise slipping in the normal direction of travel of the mower.

2. A lawn mower attachment adapted to be quickly and easily secured to the stationary cutter-bar of a lawn mower, comprising a thin, flexible, imperforate blade, a narrow, elongated, imperforate clamping bar applied to the rear portion of the blade face throughout the greater part of its length, a plurality of separate clamping lugs applied to the clamping bar, each lug having on its front edge a pair of alined spaced apart flanges extending over the front edge of the clamping bar and of slightly less height than the thickness of the clamping bar, said flanges forming shoulders against which the front edge of said clamping bar abuts, each of said lugs having on its rear edge a flange of greater height than the height of the front flanges so as to position the bottom face of each lug substantially parallel with the bar and blade when these parts are secured in place on the lawn mower, each of said lugs having an aperture just in front of its rear flange, and a headed fastening element passing through each of said lug apertures between the rear edge of the clamping bar and the front edge of the lug rear flange and adapted to be rigidly fixed to said cutter-bar to tightly clamp the clamping bar against the blade and the blade against the cutter-bar with the clamping bar and blade being free of any elements passing therethrough, and the clamping bar being rigidly held between said front flanges and the fastening elements to positively hold the clamping bar against slipping in the normal direction of travel of the mower.

3. A lawn mower attachment adapted to be quickly and easily secured to the stationary cutter-bar of a conventional lawn mower, comprising a thin, flexible, imperforate blade having some of its corners bent below the plane of the blade, a narrow, elongated, imperforate clamping bar applied to the rear portion of the blade bottom face, a plurality of separate clamping lugs each having an aperture and a pair of spaced apart alined front flanges and a rear flange, said front flanges forming shoulders against which the front edge of the clamping bar abuts, said rear flange being of a height equal to the combined thickness of the blade and clamping bar, and a headed fastening element passing through each of said lug apertures and adapted to be securely fixed to the cutter-bar to tightly clamp the clamping bar against the blade and the blade against the cutter-bar, the clamping lugs each having three-point support with relation to the front edge of the clamping bar and the cutter-bar, with the clamping bar contacting the front flanges and the fastening elements, whereby the imperforate clamping bar is firmly held against edgewise slipping in the normal direction of travel of the mower, and the clamping lugs are positively held against turning when striking an obstruction during use of the lawn mower and when tightening the lugs during application of the parts to the lawn mower.

ALFRED PETERSEN.

REFERENCES CITED

The following references are of record in the file of this patent:

UNITED STATES PATENTS

| Number | Name | Date |
| --- | --- | --- |
| 905,591 | Rowe | Dec. 1, 1908 |
| 1,104,291 | Clark | July 21, 1914 |
| 1,461,532 | Lane | July 10, 1923 |
| 1,795,102 | Wenham | Mar. 3, 1931 |
| 2,078,046 | Waldman | Apr. 20, 1937 |